United States Patent
Moehwald et al.

(10) Patent No.: US 8,022,165 B2
(45) Date of Patent: Sep. 20, 2011

(54) CATALYTIC PROCESS FOR THE PHOSPHONYLATION OF HIGH-TEMPERATURE POLYMERS

(75) Inventors: Helmut Moehwald, Annweiler (DE); Thorsten Bock, Freiburg (DE); Rolf Muelhaupt, Freiburg (DE)

(73) Assignee: BASF SE, Ludwigshafen (DE)

( * ) Notice: Subject to any disclaimer, the term of this patent is extended or adjusted under 35 U.S.C. 154(b) by 398 days.

(21) Appl. No.: 12/278,977

(22) PCT Filed: Feb. 13, 2007

(86) PCT No.: PCT/EP2007/051391
§ 371 (c)(1),
(2), (4) Date: Aug. 11, 2008

(87) PCT Pub. No.: WO2007/093596
PCT Pub. Date: Aug. 23, 2007

(65) Prior Publication Data
US 2009/0253840 A1   Oct. 8, 2009

(30) Foreign Application Priority Data
Feb. 16, 2006 (EP) ..................... 06110052

(51) Int. Cl.
*C08G 79/02* (2006.01)
*C08G 79/04* (2006.01)
*C08G 79/00* (2006.01)

(52) U.S. Cl. ........ 528/167; 528/169; 528/397; 528/398; 528/491; 528/503; 525/534; 525/538

(58) Field of Classification Search .................. 528/167, 528/169, 397, 398, 491, 503; 525/538, 534
See application file for complete search history.

(56) References Cited

U.S. PATENT DOCUMENTS

| | | | |
|---|---|---|---|
| 4,413,106 A | 11/1983 | Coplan et al. | |
| 5,540,741 A | 7/1996 | Gozdz et al. | |
| 6,828,407 B2 | 12/2004 | Sasaki et al. | |
| 2002/0161174 A1 | 10/2002 | Sasaki et al. | |
| 2003/0166824 A1 | 9/2003 | Sasaki et al. | |
| 2004/0210007 A1 | 10/2004 | Sasaki et al. | |

FOREIGN PATENT DOCUMENTS

| | | |
|---|---|---|
| DE | 101 48 131 | 5/2003 |
| EP | 0 008 895 A1 | 3/1980 |
| EP | 0 574 791 A2 | 12/1993 |
| EP | 0 575 807 A1 | 12/1993 |
| EP | 1 238 998 | 9/2002 |
| JP | 2000-294033 | 10/2000 |
| JP | 2001-233974 | 8/2001 |
| JP | 2002-25580 | 1/2002 |
| JP | 2003-238678 | 8/2003 |
| JP | 2003-282096 | 10/2003 |
| WO | WO 98/44576 | 10/1998 |
| WO | WO 99/54389 | 10/1999 |
| WO | WO 00/09588 | 2/2000 |
| WO | WO 02/077068 A2 | 10/2002 |
| WO | WO 03/054991 A1 | 7/2003 |
| WO | WO 2004/076530 A1 | 9/2004 |

OTHER PUBLICATIONS

K. Miyatake et al., "New Poly (arylene ether) s with Pendant Phosphonic Acid Groups", Journal of Polymer Science: Part A:Polymer Chemistry, vol. 39, pp. 3770-3779, (2001).
K. Jakoby et al. "Palladium-Catalyzed Phosphonation of Polyphenylsulfone", Macromol. Chem. Phys., vol. 204, No. 1, pp. 61-67, (2003).
P. Tavs et al., "Reaktion von Arylhalogeniden mit Trialkylphosphiten und Benzol-phosphonigsaure-dialkylestern zu aromatischen Phosphonsaure-estern und Phosphinsaureestern unter Nickelsalzkatalyse", Chem. Ber. 103, pp. 2428-2436, (1970).

*Primary Examiner* — Duc Truong
(74) *Attorney, Agent, or Firm* — Oblon, Spivak, McClelland, Maier & Neustadt, L.L.P.

(57) ABSTRACT

Process for preparing polymeric aromatic phosphonates and also polymeric aromatic phosphonates which can be prepared by the process of the invention and blends comprising these polymeric aromatic phosphonates and at least one further polymer and also films, composites and membranes comprising these polymers or blends, the use of the membranes of the invention in fuel cells or in separation technology and also fuel cells comprising the membranes of the invention.

21 Claims, No Drawings

CATALYTIC PROCESS FOR THE PHOSPHONYLATION OF HIGH-TEMPERATURE POLYMERS

This application is a 371 of PCT/EP07/51391, filed Feb. 13, 2007.

DESCRIPTION

The present invention relates to a process for preparing polymeric aromatic phosphonates and also polymeric aromatic phosphonates which can be prepared by the process of the invention and blends comprising these polymeric aromatic phosphonates and at least one further polymer and also films, composites and membranes comprising these polymers or blends, the use of the membranes of the invention in fuel cells or in separation technology and also fuel cells comprising the membranes of the invention.

Polymeric aromatic phosphonates and their use are known in the prior art. For example, polymeric aromatic phosphonates are used as or in polymer electrolyte membranes in fuel cell technology. These polymeric aromatic phosphonates are capable of ion exchange, preferably capable of taking up and releasing protons. The aromatic polymers substituted with phosphonic acid groups have an improved chemical and/or thermal stability compared to the sulfonated aromatic polymers customarily used as materials for fuel cells, so that membranes made up of polymeric aromatic phosphonates can be used at higher temperatures than sulfonated aromatic polymers.

Polymeric aromatic phosphonates can in principle be prepared by direct copolymerization of monomers comprising phosphonic acid functions with further monomers or by polymer-analogous reactions to introduce the phosphonic acid function. In general, polymer-analogous reactions are preferred since phosphonic acids and their derivatives generally have a considerable adverse effect on the polycondensation reactions in the synthesis of polymeric aromatic compounds such as polyarylenes, polyaryl ether ketones and polyaryl ether sulfones.

The introduction of phosphonic acid functions into polymeric aromatic compounds is described in the prior art.

Thus, K. Miyatake et al., J. Poly. Sci. A: Poly. Chem. 2001, 39, 3770 to 3779, describes polyarylene ethers bearing phosphonic acid groups. The phosphonic acid groups are introduced here by Pd-catalyzed C-P coupling of diethyl phosphite with brominated polyarylene ethers by means of tetrakis (triphenylphosphine)palladium. It is pointed out that the classical Arbuzov reaction using triethyl phosphite and nickel dichloride as catalyst requires extreme reaction conditions (temperatures of about 160° C.) and gives only low yields. According to K. Miyatake, quantitative phosphonation could be achieved when 50 mol % of the catalyst, based on the bromine present in the brominated polymer used as starting material, are used. At lower catalyst/bromine ratios, only products which are partially halogenated and thus eliminate unstable and corrosive substances in the fuel cell could be obtained.

K. Jakoby et al., Macromol. Chem. Phys. 2003, 204, 61 to 67, describes the palladium-catalyzed phosphonation of polyphenyl sulfones. According to K. Jakoby, functionalization of aromatic polymers is in principle possible either by means of a classical Michaelis-Arbuzov reaction using Pd(II) or Ni(II) salts and trialkyl phosphite or by Pd(0)-catalyzed P-C coupling. However, the first-named method (Michaelis-Arbuzov) is not particularly successful. According to the examples in K. Jacoby, no phosphonated product was able to be obtained by means of the Michaelis-Arbuzov reaction since the solvents DMAc and NMP used led to catalyst deactivation. According to K. Jacoby, a catalyst concentration of 2.5 mol %, based on the molar amount of bromine in the brominated polyaromatic compound used as starting material, is sufficient for carrying out a P-C coupling.

The publication by K. Jakoby et al. reports that 100% of bromine per repeating unit remains in the polymeric product. As a result of dehalogenation, not only the formation of corrosive HBr during fuel cell operation but also material properties which change over time are to be expected, i.e., for example, mechanical stressing of the membrane due to a change in the specific volume.

DE-A 101 48 131 relates to a process for producing proton-conducting membranes which comprise a polymer bearing phosphonic acid groups. This polymer is obtained by bromination or iodination of a base polymer and subsequent reaction of the brominated or iodinated polymer with phosphonic esters and/or phosphorous esters in the presence of a transition metal catalyst. The polymer obtained is subsequently hydrolyzed to obtain a phosphonated polymer desired for membrane production. According to the examples, phosphonation is effected by P-C coupling of a brominated polysulfone with diethyl phosphite in the presence of a Pd(0) catalyst. According to the examples, only incomplete phosphonation corresponding to a maximum degree of substitution of 88% per repeating unit of the polymer is achieved.

The Michaelis-Arbuzov reaction for preparing aromatic phosphonic esters is disclosed for low molecular weight compounds in P. Tavs, Chem. Ber. 103, 2428 to 2436 (1970). The reaction of aryl halides with trialkyl phosphites to give aromatic phosphonic esters is described in this publication. The reaction is carried out in the presence of catalytic amounts of $NiCl_2$ or $NiBr_2$ in the absence of further solvents.

U.S. Pat. No. 6,828,407 B2 relates to polymer electrolyte compositions comprising an aromatic polyphosphonic acid derivative. According to U.S. Pat. No. 6,828,407 B2, the phosphonic acid derivative is obtained by reaction of a brominated aromatic polymer with trialkyl phosphite in the presence of a nickel halide catalyst in an organic solvent. According to U.S. Pat. No. 6,828,407 B2, an amide compound is used as organic solvent. To make very complete reaction of all bromine groups comprised in the polymer possible, it is necessary to use the nickel halide catalyst in an amount of from 1 to 3 mol, preferably from 1.5 to 2 mol, per 1 mol of bromine group in the brominated aromatic polymer. According to the examples in U.S. Pat. No. 6,828,407 B2, the molar ratio of nickel catalyst used to the molar amount of bromine in the brominated aromatic polymer is 1.5:1. However, the polymer obtained comprises a residual proportion of bromine atoms.

For a person skilled in the art, it would be very desirable to achieve a phosphonylation with complete elimination of the halogen content of the polymeric aromatic phosphonate obtained, since unreacted residues of the halogenated precursors of the polymeric aromatic phosphonate, when the polymers are used as membrane in fuel cells, form hydrogen halides by reaction with hydrogen over Pt catalysts during operation of the fuel cell and these can, as strong acids, cause corrosion of the cell. Furthermore, it is desirable to reduce the catalyst requirement, which is very high in the processes of the prior art.

It is therefore an object of the present invention to provide a process by means of which halogen-free polymeric aromatic phosphonates can be obtained and which makes do with a smaller amount of catalyst than the processes of the prior art. A further object of the present invention is to provide halogen-free polymeric aromatic phosphonates which are suitable for producing membranes, for example for fuel cells.

This object is achieved by a process for preparing polymeric aromatic phosphonates by reacting halogenated polyarylene compounds with phosphorous esters in the presence of a catalyst comprising at least one metal selected from the group consisting of Ni, Pd, Pt, Rh, Ru, Os and Ir, wherein the reaction is carried out in a nitrogen-free solvent at temperatures of from 150° C. to 250° C.

According to the invention, it has been found that complete conversion of the halogenated polyarylene compounds can be achieved in the catalytic phosphonylation of halogenated polyarylene compounds in nitrogen-free solvents at temperatures above 150° C. even in the presence of small amounts of the catalyst used. The alkyl halides formed in the phosphonylation can be removed very effectively from the reaction mixture at the high reaction temperatures according to the invention, so that they do not react further in a Michaelis-Arbuzov secondary reaction to form (alkyl)phosphonic esters which are difficult to separate.

The process of the invention makes it possible to achieve not only the phosphonylation of electron-rich aryloxy units in the halogenated polyarylene compounds but also the phosphonylation of electron-poor aryl groups. This offers a route to higher degrees of functionalization of the polyarylene compounds, with an increased acidity of the phosphonic acid group introduced being present at the same time due to the more pronounced electron-pulling effect of the electron-poor aryl group. Furthermore, the process of the invention makes it possible to phosphonylate electron-poor polyarylene compounds which cannot be functionalized or can be functionalized only with difficulty by means of other processes known in the prior art. Thus, for example, phosphonylation of electron-poor poly(ether sulfones) such as Ultrason® E is possible by means of the process of the invention. In the prior art, for example, only two methods for the functionalization of Ultrason® E have hitherto been known, namely a sulfonation method (Coplan et al, U.S. Pat. No. 4,413,106) and a bromination method which leads to severe degradation (A. Botvay et al, J. appl. Poly. Sci.; 74, 1-3, 1999). Thus, no reaction at all could be achieved on brominated Ultrason® E using the Pd-catalyzed phosphonylation described by K. Jakoby et al.

The polymeric aromatic phosphonates prepared by means of the process of the invention are preferably halogen-free. For the purposes of the present patent application, "halogen-free" means that the content of halogen in the polymeric aromatic phosphonates is less than 1% by weight, preferably less than 0.5% by weight, particularly preferably less than 0.3% by weight, in each case based on the mass of the polymeric aromatic phosphonate.

The polymeric aromatic phosphonates prepared by the process of the invention preferably comprise units of the general formula I:

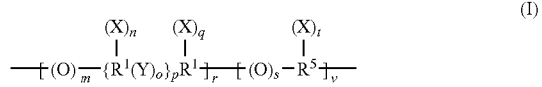

where:
X is —P(=O)(OR²)(OR³),
Y is carbonyl or sulfonyl,
R¹, R⁵ are, independently of one another, divalent or polyvalent aromatic radicals which may be substituted or unsubstituted and may optionally comprise heteroatoms,
m, o, s are each, independently of one another, 0 or 1,
n, q, t are each, independently of one another, 0 or an integer, with n, q and t not simultaneously being 0,
r, v are each, independently of one another, from 0 to 1, with the sum of r and v being from 0.95 to 1.05,
p is 0 or an integer $\geq 1$,
R², R³ are each, independently of one another, alkyl, alkenyl, cycloalkyl, aralkyl, with the abovementioned groups being able to be substituted and/or being able to comprise heteroatoms.

For the purposes of the present patent application, alkyl is a linear or branched alkyl radical which generally has from 1 to 20, preferably from 1 to 8, particularly preferably from 1 to 6, very particularly preferably from 1 to 4, carbon atoms. It is also possible for the carbon chain of the alkyl group to be interrupted by heteroatoms or heteroatom-comprising groups, for example by O or by NR⁶, where R⁶ can again be alkyl, alkenyl, cycloalkyl, aryl or aralkyl. Suitable alkyl groups are, for example, methyl, ethyl, n-propyl, i-propyl, n-butyl, s-butyl, t-butyl, 1-pentyl, t-pentyl, 1-hexyl, 1-octyl, i-octyl, t-octyl, 2-ethylhexyl, nonyl, decyl, undecyl, dodecyl, tridecyl, tetradecyl, pentadecyl, hexadecyl, heptadecyl, octadecyl, nonadecyl, eicosyl, 1,4-tetramethylene. The alkyl groups can also be substituted by alkenyl, cycloalkyl, aryl or aralkyl or heteroatoms or heteroatom-comprising groups, e.g. halogens or halogen-comprising groups. Furthermore, for the purposes of the present patent application, the term alkyl also encompasses alkoxy groups which are based on the abovementioned alkyl radicals. In addition, the term alkyl also encompasses oxymethylene and oxyethylene derivatives which are preferably oligomeric, e.g. groups of the formula —(CH₂CH₂)ₙOCH₃, where n is an integral variable from 1 to 100, preferably from 1 to 10, particularly preferably from 1 to 5.

Preferred alkyl groups for the purposes of the present patent application are ethyl, i-propyl and n-butyl, unless other alkyl groups are expressly mentioned in the following description.

For the purposes of the present patent application, the term alkenyl refers to groups which can be linear or branched and have from 2 to 20, preferably from 2 to 8, particularly preferably from 2 to 6, very particularly preferably from 2 to 4, carbon atoms. The carbon chains of the alkenyl groups can also be interrupted by heteroatoms, for example by O or NR⁶, where R⁶ has been defined above. The alkenyl groups can also be substituted by the groups mentioned in respect of the alkyl groups.

Suitable alkenyl groups are, for example, butenyl, hexenyl, octenyl in all isomeric forms. For the purposes of the present patent application, the term cycloalkyl refers to substituted and unsubstituted cycloalkyl groups having from 3 to 20, preferably from 3 to 12, particularly preferably from 3 to 6, carbon atoms, in the cyclic skeleton. Suitable substituents for the cycloalkyl groups are the substituents mentioned above in respect of the alkyl groups. Furthermore, it is possible for one or more carbon atoms of the cyclic skeleton to be replaced by heteroatoms or heteroatom-comprising groups, e.g. O, S or NR⁶, where R⁶ is as defined above. Suitable cycloalkyl groups are, for example, 1-cyclooctyl, 1-cycloheptyl, 1-cyclohexyl, 1-cyclopentyl, 1-methylcyclopentyl, 1-methyl-cyclohexyl, 1-methyl-4-i-propylcyclohexyl, preferably 1-cyclopentyl, 1-cyclohexyl and 1-cyclooctyl.

For the purposes of the present patent application, suitable aryl groups are substituted and unsubstituted aryl groups. The aryl groups preferably have from 6 to 24, particularly preferably from 6 to 12, carbon atoms in the skeleton. The term aryl groups also encompasses groups in which two or more aryl groups are linked via one or more single bonds, e.g. biphenyl.

Suitable substituents have been mentioned above in respect of the alkyl radicals. One or more of the carbon atoms of the skeleton can be replaced by heteroatoms, e.g. O, S or N. Preferred aryl groups are phenyl and biphenyl.

Suitable aralkyl groups for the purposes of the present patent application are substituted or unsubstituted aralkyl groups having from 7 to 20, preferably from 7 to 18, particularly preferably from 7 to 14, carbon atoms in the aralkyl radical. It is possible for one or more of the carbon atoms in the aryl radical of the aralkyl radical or in the alkyl radical of the aralkyl radical to be replaced by heteroatoms or heteroatom-comprising groups, for example O or $NR^6$, where $R^6$ is as defined above. Furthermore, the aralkyl groups may be substituted by the substituents mentioned in respect of the alkyl groups. Suitable aralkyl groups are, for example, m/p-phenylethyl or benzyl, m/p-tolyl and i-xylyl.

For the purposes of the present patent application, divalent or polyvalent aromatic radicals are substituted or unsubstituted radicals which may comprise heteroatoms. Suitable substituents are the substituents mentioned above in respect of the alkyl radicals. Suitable heteroatoms are, for example, N, O or S. Preferred radicals are divalent aromatic radicals. Particularly preferred radicals are mentioned below in the definition of $R^1$ and $R^5$.

In a preferred embodiment, $R^2$ and $R^3$ in the polymeric aromatic phosphonates comprising units of the formula I are each, independently of one another, methyl, ethyl, n-propyl, i-propyl, n-butyl, 1-(but-3-enyl), s-butyl, t-butyl, 1-pentyl, t-pentyl, 1-hexyl, 1-octyl, i-octyl, t-octyl, 2-ethylhexyl, 1-cyclooctyl, 1-cycloheptyl, 1-cyclohexyl, 1-cyclopentyl, 1-methylcyclopentyl, 1-methylcyclohexyl, 1-methyl-4-i-propyl-cyclohexyl, nonyl, decyl, undecyl, dodecyl, tridecyl, tetradecyl, pentadecyl, hexadecyl, heptadecyl, octadecyl, nonadecyl, eicosyl, 1,4-tetramethylene, —$(CH_2CH_2)_nOCH_3$, where n is from 1 to 100, preferably from 1 to 10, particularly preferably from 1 to 5. Particular preference is given to $R^2$ and $R^3$ each being, independently of one another, $C_1$-$C_8$-alkyl, very particularly preferably $C_1$-$C_4$-alkyl, in particular ethyl, butyl. $R^2$ and $R^3$ particularly preferably have the same meaning.

In a preferred embodiment, $R^1$ and $R^5$ are each, independently of one another, a divalent aromatic radical which can be substituted or unsubstituted and may optionally comprise heteroatoms. Particular preference is given to $R^1$ and $R^5$ each being, independently of one another arylene, for example 1,4-phenylene, 1,3-phenylene, 1,2-phenylene, 1,6-naphthylene, 2,4-naphthylene, 2,6-carbazole, 3-phenyl-1,4-arylene, 3-alkyl-1,4-arylene, 2-alkyl-1,4-arylene, 2-alkoxy-1,4-arylene, 3-alkoxy-1,4-arylene, 2,4-dimethyl-1,4-phenylene, 2,3,5,6-tetramethyl-1,4-phenylene, 4,4'-biphenylene, 3,3'-diphenyl-4,4'-biphenylene, or arylenealkylene, for example 2,2'-isopropylidenebis(1,4-phenylene). Suitable alkyl radicals for the purposes of the present patent application have been mentioned above. Suitable alkoxy radicals are those comprising the abovementioned alkyl radicals. Preferred alkyl radicals in the groups suitable as $R^1$ and $R^5$ are $C_1$-$C_4$-alkyl radicals, particularly preferably t-butyl radicals. The divalent aromatic radicals are very particularly preferably unsubstituted. Particularly preferred radicals $R^1$ and $R^5$ are 1,4-phenylene, 1,3-phenylene, 1,2-phenylene, 2,2'-isopropylidenebis(1,4-phenylene), 4,4'-biphenylene, 3,3'-diphenyl-4,4'-biphenylene.

In a preferred embodiment, the polymeric aromatic phosphonates consist exclusively of units of the formula (I).

If Y in the polymeric aromatic phosphonates comprising units of the formula I is carbonyl and o is not 0, the polymeric aromatic phosphonates comprising units of the formula I are homopolyarylene ketones or copolyarylene ketones.

If Y in the units of the formula I is sulfonyl and o is not 0, the polymeric aromatic phosphonates are homopolyarylene sulfones or copolyarylene sulfones.

Furthermore, if m and/or s in the units of the formula I are different from 0, the compounds are copolyarylene sulfones or copolyarylene ketones having one or more aromatic arylene ether units.

If m, o and s are each 0, the polymeric aromatic phosphonates comprising units of the formula I are derivatives of homopolyarylenes and copolyarylenes.

If only o is 0 and s and m are different from 0, the polymeric aromatic phosphonates comprising units of the formula I are copolyarylene ethers.

n, q and t are the respective number of phosphonate groups on the aromatic radicals $R^1$ and $R^5$. In a preferred embodiment, n, q and t are each, independently of one another, from 0 to 4, preferably 0 or 1, with the proviso that n, q and t are not simultaneously 0.

In a preferred embodiment, p is from 0 to 4, particularly preferably from 0 to 2.

Polymeric aromatic phosphonates are, for the purposes of the present patent application, preferably polymeric aromatic phosphonates which have a weight average molecular weight $M_w$ of generally 60 000 g/mol, preferably at least 20 000 g/mol, particularly preferably at least 30 000 g/mol, very particularly preferably from 30 000 to 90 000 g/mol. The molecular weight is determined by gel permeation chromatography using polystyrene standards.

The degree of functionalization of the polymeric aromatic phosphonate of the present patent application is generally at least 30%, preferably at least 50%, particularly preferably at least 75%, very particularly preferably at least 100%, more preferably at least 150%. Here, a degree of functionalization of at least 30% means that at least 30% of the repeating units of the polyarylene compounds used as starting substances, preferably the polyarylene compounds of the formula IV below, are substituted with phosphonic acid groups, preferably groups of the formula —$P(=O)(OR^2)(OR^3)$, where $R^2$ and $R^3$ are as defined above. Preference is given to at least 50%, particularly preferably at least 75%, very particularly preferably at least 100%, more preferably at least 150% of the repeating units being substituted with phosphonic acid groups, preferably groups of the formula —$P(=O)(OR^2)(OR^3)$, where $R^2$ and $R^3$ are as defined above. A functionalization of 150% means a 1.5-fold functionalization of the respective repeating units of the polyarylene compounds, in particular the polyarylene compounds of the general formula IV. In principle, the degree of functionalization can be as high as desired as long as the solubility of the polymeric aromatic phosphonates in suitable solvents is ensured. Suitable solvents are mentioned below.

Particularly preferred polymeric aromatic phosphonates are based on polymeric aromatic compounds (polyarylene compounds) selected from the group consisting of polysulfones, polyether sulfones, polyether ketones, polyether ether ketones, polyether ketone ketones, polyarylene oxides, polyarylene sulfides, polyimides, polybenzimidazoles, polyoxadiazoles, polytriazoles and polyphosphazenes. Particularly preferred polymeric aromatic compounds are polysulfones, polyether sulfones, polyether ketones, polyether ether ketones and polyether ketone ketones. The abovementioned polyarylene compounds and methods of preparing them are known to those skilled in the art. Some of the abovementioned polyarylene compounds are commercially available. Examples of commercially available, suitable polyarylene compounds are poly(ether sulfone) (ULTRASON® E, where Y=SO$_2$, R$^1$=Ph, m, o, p=1, v=0 and r=1), poly(sulfone) (ULTRASON® S, where Y=SO$_2$, R$^1$=Ph, m, o, p, r, v=1 and R$^5$=2,2'-isopropylidene-bis(1,4-phenylene)), poly(phenyl sulfone) (RADEL® R5000, where Y=SO$_2$, R$^1$=Ph, m, o, p, r, v=1 and R$^5$=4,4'-biphenyl) and poly(ether ketone) (VIC-TREX® 450 P, where Y=CO, R$^1$ and R$^5$=Ph and m, o, p, r and v=1).

In the process of the invention, the polymeric aromatic phosphonates are obtained by reacting halogenated polyarylene compounds with phosphorous esters.

The halogenated polyarylene compounds generally comprise units of the general formula II:

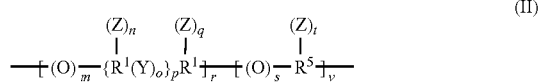

(II)

The symbols and radicals in formula II have the same meanings as the corresponding symbols and radicals in formula I.

Z in formula II is halogen, preferably Br, or I, particularly preferably Br.

Preferred embodiments of the halogenated polyarylene compounds comprising units of the formula II correspond to the preferred embodiments of the abovementioned polymeric aromatic phosphonates, except that the group Z is present in the halogenated polyarylene compounds in place of the group X in the aromatic phosphonates.

In the process of the invention, phosphorous esters are used for the reaction with the halogenated polyarylene compounds. Preference is given to using alkyl esters of phosphorous acid which particularly preferably have the general formula III:

P(OR$^2$)(OR$^3$)(OR$^4$)                                              (III)

where:
R$^2$, R$^3$ have, independently of one another, the meanings given above for the radicals R$^2$ and R$^3$ in formula I,
R$^4$ has, independently of R$^2$ and R$^3$, one of the meanings given for R$^2$ and R$^3$.

In a particularly preferred embodiment, the radicals R$^2$, R$^3$ and R$^4$ have the same meanings. Very particular preference is given to using triethyl phosphite and tributyl phosphite.

The catalysts used in the process of the invention comprise at least one metal selected from the group consisting of nickel, palladium, platinum, rhodium, ruthenium, osmium and iridium. The catalyst used preferably comprises nickel and/or palladium. Nickel and palladium can be present in the oxidation states 0 to +2, i.e. use is made of either nickel and/or palladium salts or complexes of nickel and/or palladium.

Suitable salts of nickel and/or palladium are halides, preferably chlorides, bromides or iodides, particularly preferably chlorides, pseudohalides, preferably cyanides, OCN, SCN, particularly preferably cyanides, β-diketonates, preferably acetylacetonates. Preferred salts of nickel are nickel(II) salts.

If nickel(0) complexes are used, preference is given to Ni[CO]$_4$, Ni[P(OR)$_3$]$_4$, where R is a linear or branched C$_1$-C$_{20}$-alkyl radical, preferably ethyl, as disclosed, for example, in J. Org. Chem. 1980, 45, 5426 to 5429.

Suitable Pd(0) complexes are, for example, triphenylphosphine complexes or dibenzylideneacetonates. Examples are tetrakis(triphenylphosphine)palladium and tris(dibenzylideneacetone)palladium.

In a preferred embodiment of the process of the invention, a catalyst comprising nickel, preferably Ni(0) or Ni(II), in particular a catalyst comprising nickel in the form of a nickel (II) salt, is used. Suitable salts have been mentioned above. Particular preference is given to using a nickel(II) halide, in particular NiCl$_2$, as catalyst in the process of the invention.

In the process of the invention, in particular, complete conversion of the halogenated polyarylene compounds into the polymeric aromatic phosphonates can be achieved even in the presence of small amounts of the catalyst used, generally giving halogen-free polymeric aromatic phosphonates. The catalyst is preferably used in an amount of from 0.05 to <1 molar equivalents, particularly preferably from 0.05 to 0.5 molar equivalents, very particularly preferably from 0.05 to 0.1 molar equivalents, in each case based on the number of molar equivalents of the halogen in the halogenated polyarylene compounds used, in the process of the invention. If the molar catalyst/halogen ratio is less than 0.05, complete conversion of bromine is not ensured.

According to the invention, a nitrogen-free solvent is used as solvent. This nitrogen-free solvent can be an individual solvent or a mixture of various solvents. The nitrogen-free solvent or the mixture of nitrogen-free solvents preferably has a boiling point above 150° C. Suitable solvents are selected from the group consisting of diphenyl ethers, benzophenone, diphenyl sulfone, the alkyl- or alkoxy-substituted derivatives of these compounds, in particular the methyl-, ethyl-, propyl-, butyl-, methoxy-, ethoxy-, propoxy-, butoxy-substituted derivatives, aliphatic, partly aromatic, aromatic oligoethers and polyethers, aliphatic, partly aromatic, aromatic β-diketones, for example acetylacetone, acetylbenzophenone and 1,34-diphenylpropane-1,3-dione, the alkyl-, alkoxy-, aryl- and aryloxy-substituted derivatives of these compounds, aliphatic, partly aromatic, aromatic keto ethers, the alkyl-, alkoxy-, aryl-, aryloxy-substituted derivatives of these compounds, aliphatic, partly aromatic, aromatic carboxylic esters and aliphatic, partly aromatic, aromatic carbonates, alkyl-, alkoxy-, aryl- and aryloxy-substituted derivatives of these compounds and mixtures of the abovementioned solvents. Preference is given to using benzophenone, diphenyl ether and diphenyl sulfone or dimethyl-, ethyl-, propyl-, butyl-, methoxy-, ethoxy-, propoxy-, butoxy-substituted derivatives of these compounds as solvents. Very particular preference is given to using diphenyl ether and benzophenone.

The reaction temperature in the process of the invention is, according to the invention, from 150 to 250° C. The process of the invention is preferably carried out at temperatures of from 170 to 250° C., particularly preferably at temperatures of from 190 to 250° C.

In the process of the invention, the polymeric aromatic phosphonates prepared according to the process of the invention are generally obtained in the form of mixtures comprising from 0.1 to 90% by weight of one or more polymeric aromatic phosphonates which have been prepared according to the process of the invention and from 10 to 99.9% by weight of a nitrogen-free solvent, preferably a nitrogen-free solvent as defined above.

The proportion of polymeric aromatic phosphonates in the mixtures obtained is preferably not more than 90% by weight, particularly preferably not more than 80% by weight, very particularly preferably not more than 75% by weight.

For use as membrane materials for fuel cells or other applications, the polymeric aromatic phosphonate obtained by means of the process of the invention is generally cleaved to form the corresponding polymeric phosphonic acid (ester cleavage). It is in principle likewise possible to use the polymeric aromatic phosphonate of the invention as membrane material, in particular in blends with other membrane materials.

The ester cleavage of the polymeric aromatic phosphonates can be carried out by all methods known to those skilled in the art. In a preferred embodiment, the purification of the polymeric aromatic phosphonate and the ester cleavage to give a purified polymeric phosphonic acid are carried out in the same step. The purification and simultaneous ester cleavage can, for example, be achieved by dissolution of the polymeric aromatic phosphonate prepared according to the process of the invention in a solvent, for example tetrahydrofuran or acetone, and precipitation in alcohol, with the alcohol preferably being acidified with from 0.1 to 5% by volume of a strong mineral acid such as HCl, HBr or $HNO_3$.

A preferred embodiment of the product work-up and ester cleavage is described below:

In a preferred embodiment, the phosphonylation according to the invention is carried out by placing the halogenated, particularly preferably brominated, polyarylene compound together with the catalyst used according to the invention, preferably a nickel catalyst, particularly preferably nickel(II) halide, preferably in the abovementioned amount, in a reactor, for example a glass reactor, and freeing the mixture of residual moisture at the abovementioned temperatures by passing a stream of nitrogen over it, preferably for a period of from 2 to 4 hours. In a preferred embodiment, the stream of nitrogen is maintained during the entire reaction time in order to ensure removal of volatile reaction products. After addition of the desired amount of the nitrogen-free solvent used according to the invention, a homogeneous solution is produced, preferably by stirring at the abovementioned temperature. The mixture is preferably heated to a higher temperature and the phosphorous ester, preferably the alkyl phosphite, particularly preferably triethyl phosphite or tributyl phosphite, is added dropwise so that the total amount is added to the mixture over a period of from 15 to 30 minutes and the mixture has a homogeneous nature during the entire time. The time of the dropwise addition is in principle variable and dependent on the batch size, i.e. it can be more or less than 15-30 minutes in some cases. At the beginning of the reaction, the reaction mixture can, if appropriate, be heated further within the temperature window indicated above. After a time of generally from 1 to 4 hours, the reaction mixture is cooled to, for instance, the starting temperature or a slightly lower temperature and is maintained at this temperature for a further period of generally from 4 to 12 hours.

After the reaction is complete, the reaction mixture is taken up in a low-boiling solvent, for example tetrahydrofuran or acetone, and freed of solvents, reaction residues and the catalyst by precipitation in, in general, an alcohol, preferably methanol. The amount of alcohol used for this purpose is generally from 3 to 20 times the weight of the batch. The removal of catalyst can be improved by acidifying the alcoholysis bath with, in general, from 0.1 to 5% by volume of a strong mineral acid, preferably HCl, HBr or $HNO_3$. After from 30 to 120 minutes, the alcohol is usually replaced and the procedure is repeated a number of times, preferably from 3 to 10 times. The purification and alcoholysis steps can be intensified by simultaneous action of ultrasound or by Soxhlet extraction of the mixture for a period of generally from 12 to 48 hours with a weakly acidic alcohol, in particular methanol. As an alternative, the reaction product obtained can be purified by repeated dissolution and precipitation of the reaction product in suitable solvents and acidic precipitants.

The purified polymeric phosphonic acid obtained is freed of the extractant used by drying. Drying is generally carried out at from 50 to 100° C. under reduced pressure.

The present invention thus further provides a process for preparing polymeric aromatic phosphonic acids, which comprises the steps:

a) reaction of halogenated polyarylene compounds with phosphorous esters in the presence of a catalyst comprising at least one metal selected from the group consisting of Ni, Pd, Pt, Rh, Ru, Os and Ir, with the reaction being carried out in a nitrogen-free solvent at temperatures of from 150° C. to 250° C., to give polymeric aromatic phosphonates;

b) ester cleavage of the polymeric aromatic phosphonates.

The ester cleavage in step b) can be carried out by methods known to those skilled in the art, e.g. by acidolysis or silylolysis. In a preferred embodiment, the purification of the polymeric aromatic phosphonate obtained in step a) and the ester cleavage are carried out simultaneously. A preferred process for simultaneous purification and ester cleavage has been mentioned above.

Preferred embodiments of step a) of the process of the invention for preparing polymeric aromatic phosphonates are the embodiments mentioned above in respect of the process for preparing polymeric aromatic phosphonates.

The halogenated polyarylene compounds used as starting materials in the process of the invention can be prepared from the corresponding polymeric aromatic compounds by methods known to those skilled in the art. Suitable methods are described, for example, in DE-A 101 48 131 and U.S. Pat. No. 6,828,407 B2. The halogenated polyarylene compounds are preferably prepared by reacting the corresponding polyarylene compounds with a halogenating agent. Preferred polyarylene compounds comprise units of the general formula IV

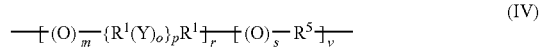

(IV)

where the symbols and radicals have the meanings given above in the definitions for formula I.

Preferred embodiments of the radicals and symbols mentioned have likewise been mentioned above.

The halogenation of the compounds of the formula IV is generally carried out at a temperature of from −20 to 140° C., preferably from 20 to 140° C., particularly preferably from 25 to 100° C. The halogenation is usually carried out in an inert solvent. Suitable inert solvents are, for example, alkylcarboxylic acids, chlorinated hydrocarbons, inorganic acids such as sulfuric acid, alkylsulfonic acids or mixtures thereof.

Suitable halogenating agents are known to those skilled in the art. Preference is given to carrying out a bromination or iodination. Preferred brominating agents are elemental bromine and N-bromo compounds such as N-bromosuccinimide or dibromoisocyanuric acid.

The desired degree of halogenation can be controlled by means of the time for which the halogenating agent used is allowed to act, the molar ratio of halogenating agent to polymer and the temperature. In general, a degree of halogenation of from 50 to 200%, preferably from 75 to 175%, particularly preferably from 75 to 125%, is set.

The degree of halogenation, in particular the degree of bromination, can be determined by means of conventional methods, for example via the weight of product, by NMR spectroscopy or by elemental analysis. These methods are known to those skilled in the art.

Methods of brominating various polyarylene compounds of the formula (IV) are described by way of example below:

A polyarylene compound in which Y=SO$_2$ and v≠0, for example poly(sulfone), e.g. ULTRASON® S, can be dissolved, for example, in chlorinated hydrocarbons such as methylene chloride, chloroform, dichloroethane, trichloroethane or tetrachloroethane, particularly preferably chloroform. Bromination is subsequently effected by addition of elemental bromine diluted with an inert solvent and stirring at from room temperature to the reflux temperature of the solvent. The degree of bromination can be controlled by setting of a particular bromine/polymer molar ratio, by means of the reaction temperature and by means of the reaction time. To stop the reaction, the reaction mixture is precipitated in a solvent in which the polymer obtained is insoluble, e.g. acetone, methanol, i-hexane or mixtures thereof, comminuted mechanically and purified by extraction with an aliphatic alcohol, preferably a C$_1$-C$_6$-alcohol, particularly preferably methanol, over a base, preferably an alkali metal hydroxide, particularly preferably potassium hydroxide, for, in general, 24 hours.

A polymeric aromatic compound of the formula IV in which m, p, q and o are each 1, v=o and R$^1$ is phenyl, for example ULTRASON® E, is preferably reacted in concentrated sulfuric acid as solvent. As brominating agent, use is made of an N-bromo compound, for example N-bromosuccinimide (Chem. Rev., 60, 16, 271 to 317, 1984) or dibromoisocyanuric acid (Monatshefte für Chemie, 99, 815 to 822, 1968) in the form of a solution in the same solvent. The bromination is carried out with stirring of the mixture at temperatures of generally from 0 to 50° C. for a period of generally from 1 to 24 hours. To work up the reaction mixture, it is generally precipitated in a from 2- to 20-fold excess of distilled water and the product is comminuted mechanically and, after further washing with distilled water, purified by extraction with an aliphatic alcohol, preferably a C$_1$-C$_6$-alcohol, particularly preferably methanol, over a base, preferably an alkali metal hydroxide, particularly preferably potassium hydroxide, for, in general, from 12 to 48 hours.

If a polymeric aromatic compound of the formula IV in which Y=CO, for example poly(ether ether ketone) (e.g. VICTREX® 450 P) is used, solutions are firstly prepared by stirring the polymer in alkylsulfonic acids such as methanesulfonic, ethanesulfonic and propanesulfonic acid, preferably methanesulfonic acid, at temperatures of ≦100° C., preferably from 50 to 100° C. The bromination can be carried out by addition of a particular amount of an N-bromo compound such as N-bromosuccinimide or dibromoisocyanuric acid in the form of a solution in the same solvent and stirring at temperatures of generally from 0 to 100° C. for a period of generally from 1 to 24 hours. To work up the reaction mixture, it is preferably precipitated in a large excess of distilled water and the product is comminuted mechanically and, after further washing with distilled water, usually in large amounts, purified by extraction with an aliphatic alcohol, preferably a C$_1$-C$_6$-alcohol, particularly preferably methanol, over a base, preferably an alkali metal hydroxide, particularly preferably potassium hydroxide, for, in general, from 12 to 48 hours.

In a further embodiment, the present invention therefore provides a process for preparing polymeric aromatic phosphonates, which comprises the steps:
i) halogenation of a polyarylene compound to give a halogenated polyarylene compound,
ii) reaction of the halogenated polyarylene compound with phosphorous esters in the presence of a catalyst comprising at least one metal selected from the group consisting of Ni, Pd, Pt, Rh, Ru, Os and Ir, with the reaction being carried out in a nitrogen-free solvent at temperatures of from 150° C. to 250° C.

Preferred embodiments of steps i) and ii) and preferred compounds used and obtained in these steps have been mentioned above.

In contrast to polymeric aromatic phosphonates prepared by processes in the prior art, the phosphonates prepared by the process of the invention are halogen-free. Phosphonic acids prepared from these phosphonates are therefore suitable for use in fuel cells. For this purpose, it is important that the polymeric aromatic phosphonic acids used comprise no halogen-comprising impurities or residues of unreacted haloaryl precursors. Halogen-comprising residues can, when the phosphonic acids are used in fuel cells, react with hydrogen over Pt catalysts during operation of the fuel cells to form hydrogen halides which can, as strong acids, cause corrosion of the fuel cell. Removal of the bromine substituents by reductive dehalogenation can also result in material properties which can change over time, e.g. stress cracks caused by shrinkage of the membrane material. Furthermore, the process of the invention makes it possible to obtain polymeric aromatic phosphonates and phosphonic acids in which not only the halogen groups bound to electron-rich ether segments of the halogenated polyarylene compounds but also the less reactive halogen groups bound to the further divalent or polyvalent aromatic radicals are reacted with the phosphorous esters. These are the radicals adjacent to the Y radical in the preferred compounds of the formula I.

The present invention therefore further provides polymeric aromatic phosphonates prepared by the process of the invention and also polymeric aromatic phosphonic acids which are obtained by hydrolysis of the corresponding aromatic phosphonates according to the invention, as described below.

The aromatic phosphonic acids of the invention preferably have the general formula V

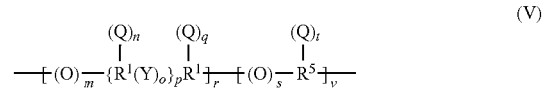

The symbols and radicals in this formula have the same meanings as the corresponding symbols and radicals in formula I.

The group Q in formula V is —P=O(OH)$_2$.

Preferred embodiments of the phosphonic acids of the invention correspond to phosphonic acids which have the preferred and particularly preferred radicals and groups mentioned above for formula I. Preferred molar masses of the phosphonic acids of the invention correspond to those of the corresponding phosphonates.

The polymeric aromatic phosphonic acids of the invention, in particular those comprising units of the formula V, can be used for producing membranes, films or composites. The polymeric aromatic phosphonic acids of the invention are preferably used for producing membranes. These proton-conducting membranes can be used as membranes in fuel cells or in separation technology, for example as selectively permeable membranes in the desalination of water, wastewater purification, dialysis or ion extraction or retention.

The present invention therefore further provides membranes, films and composites comprising at least one polymeric aromatic phosphonic acid according to the present invention. Preference is given to a polymeric aromatic phosphonic acid comprising units of the formula V.

The aromatic phosphonic acids of the invention and the aromatic phosphonates of the invention can also be used together with further compounds, for example in the form of polymer blends. These polymer blends are likewise suitable for producing membranes, films or composites as mentioned above.

Suitable partners for polymer blends are unfunctionalized polymers. For the purposes of the present invention, the term "unfunctionalized polymer" refers to polymers which are neither perfluorinated and sulfonated or carboxylated (ionomeric) polymers such as Nafion® or Flemion® (carboxylic-acid polyelectrolyte) nor polymers which have been functionalized with suitable groups such as —SO$_3$H groups or —COOH groups to obtain sufficient proton conductivity. These unfunctionalized polymers which can be used in the present invention are subject to no particular restrictions as long as they are stable in the applications in which the polymer systems of the invention are used. If, according to a preferred use, these are used in fuel cells, use can be made of polymers which are thermally stable up to 100° C., preferably up to 200° C. or higher, and have a very high chemical stability. Preference is given to using:

polymers having an aromatic backbone, for example polyimides, polysulfones, polyether sulfones such as Ultrason®, polyaryl ether ketones such as polyether ether ketones (PEEK), polyether ketones (PEK), polyether ketone ketones (PEKK), polyether ether ketone ketones (PEEKK), polybenzothiazoles, polybenzimidazoles, polyamides, polyphenylene oxides, e.g. poly-2,6-dimethyl-1,4-phenylene oxides, polyphenylene sulfides, polyphenylenes, polymers having a fluorinated backbone, for example Teflon® or PVDF, thermoplastic polymers or copolymers, for example polycarbonates such as polyethylene carbonate, polypropylene carbonate, polybutadiene carbonate or polyvinylidene carbonate or polyurethanes as are described, inter alia, in WO 98/44576, crosslinked polyvinyl alcohols, vinyl polymers such as polymers and copolymers of styrene or methylstyrene, vinyl chloride, acrylonitrile, methacrylonitrile, N-methylpyrrolidone, N-vinylimidazole, vinyl acetate, vinylidene fluoride, copolymers of vinyl chloride and vinylidene chloride, vinyl chloride and acrylonitrile, vinylidene fluoride and hexafluoropropylene, terpolymers of vinylidene fluoride and hexafluoropropylene and a compound from the group consisting of vinyl fluoride, tetrafluoroethylene and trifluoroethylene; such polymers are disclosed, for example in U.S. Pat. No. 5,540,741 whose relevant disclosure is fully incorporated by reference into the present application;

phenol-formaldehyde resins, polytrifluorostyrene, poly-2,6-diphenyl-1,4-phenylene oxide, polyaryl ether sulfones, polyarylene ether sulfones, phosphonated poly-2,6-dimethyl-1,4-phenylene oxide;

homopolymers, block polymers and copolymers prepared from:

olefinic hydrocarbons such as ethylene, propylene, butylene, isobutene, propene, hexene or higher homologues, butadiene, cyclopentene, cyclohexene, norbornene, vinylcyclohexane, acrylic or methacrylic esters such as methyl, ethyl, propyl, isopropyl, butyl, isobutyl, hexyl, octyl, decyl, dodecyl, 2-ethylhexyl, cyclohexyl, benzyl, trifluoromethyl, or hexafluoropropyl esters or tetrafluoropropyl acrylate or tetrafluoropropyl methacrylate, vinyl ethers such as methyl, ethyl, propyl, isopropyl, butyl, isobutyl, hexyl, octyl, decyl, dodecyl, 2-ethylhexyl, cyclohexyl, benzyl, trifluoromethyl, or hexafluoropropyl or tetrafluoropropyl vinyl ether;

basic, nitrogen-comprising polymers such as poly(p-phenylquinoxaline), poly(benzimidazoles)

All these unfunctionalized polymers can in principle be used in crosslinked or uncrosslinked form. It is also possible to use mixtures of the polymers mentioned.

Particularly preferred unfunctionalized polymers suitable as blend partners are polymers having an aromatic backbone, for example polyimides, polysulfones, polyether sulfones such as Ultrason®, polyaryl ether ketones such as polyether ether ketones (PEEK), polyether ketones (PEK), polyether ketone ketones (PEKK), polyether ether ketone ketones (PEEKK), polybenzothiazoles, polybenzimidazoles, polyamides, polyphenylene oxides, e.g. poly-2,6-dimethyl-1,4-phenylene oxides, polyphenylene sulfides, polyphenylenes. Very particular preference is given to polysulfones and polyether sulfones.

The polymeric aromatic phosphonic acid of the invention and/or the polymeric aromatic phosphonate of the invention can also be used together with one or more further functionalized polymers. For the present purposes, functionalized polymers are polymers which are ion-conducting, in particular proton-conducting. They can be either basic or acidic polymers. Preferred proton-conducting polymers having acid groups are polymers comprising sulfonic acid groups, phosphonic acid groups and/or carboxylic acid groups. For the purposes of the present invention, sulfonic acid, carboxylic acid and/or phosphonic acid groups are groups of the formulae —SO$_3$X, —COOX and —PO$_3$X$_2$, where X is H, NH$_4^+$, NH$_3$R$^+$, NH$_2$R$_2^+$, NHR$_3^+$ or NR$_4^+$, where R is any radical, preferably an alkyl radical, which may, if appropriate, bear one or more further radicals which can release protons under conditions usually prevailing in fuel cells. These polymers are known to those skilled in the art and are either commercially available or can be prepared by methods known to those skilled in the art. Suitable functionalized polymers are, for example, disclosed in WO 2004/076530, EP-A 0 574 791, EP-A 0 008 895, EP-A 0 575 807, WO 02/077068, WO 03/054991, JP 2000294033 A2, JP 2001233974 A2 and JP 2002025580. Preferred basic polymers are poly(benzimidazole), poly(p-phenylquinoxaline) or mixtures thereof. These polymers are known to those skilled in the art and are either commercially available or can be prepared by methods known to those skilled in the art.

Preferred functionalized polymers are, for example, polymers which comprise sulfonic acid groups and are selected from the group consisting of perfluorinated sulfonated hydrocarbons such as Nafion® from E. I. DuPont, sulfonated aromatic polymers such as sulfonated polyaryl ether ketones such as polyether ether ketones (sPEEK), sulfonated polyether ketones (sPEK), sulfonated polyether ketone ketones (sPEKK), sulfonated polyether ether ketone ketones (sPEEKK), sulfonated polyarylene ether sulfones, sulfonated polybenzobisbenzazoles, sulfonated polybenzothiazoles, sulfonated polybenzimidazoles, sulfonated polyamides, sulfonated polyether imides, sulfonated polyphenylene oxides, e.g. poly-2,6-dimethyl-1,4-phenylene oxides, sulfonated polyphenylene sulfides, sulfonated phenol-formaldehyde resins (linear or branched), sulfonated polystyrenes (linear or branched), sulfonated polyphenylenes and further sulfonated aromatic polymers.

The sulfonated aromatic polymers can be partially fluorinated or perfluorinated. Further sulfonated polymers comprise polyvinylsulfonic acids, copolymers made up of acrylonitrile and 2-acrylamido-2-methyl-1-propanesulfonic acids, acrylonitrile and vinylsulfonic acids, acrylonitrile and styrenesulfonic acids, acrylonitrile and methacryloxyethylenoxypropanesulfonic acids, acrylonitrile and methacryloxyethylenoxytetrafluoroethylenesulfonic acids, etc. The polymers can again be partially fluorinated or perfluorinated. Further groups of suitable sulfonated polymers comprise sulfonated polyphosphazenes such as poly(sulfophenoxy)phosphazenes or poly(sulfoethoxy)phosphazenes. The polyphosphazene polymers can be partially fluorinated or perfluorinated. Sulfonated polyphenylsiloxanes and copolymers thereof, poly(sulfoalkoxy)phosphazenes, poly(sulfotetrafluoroethoxypropoxy)siloxanes are likewise suitable.

Examples of suitable polymers comprising carboxylic acid groups comprise polyacrylic acid, polymethacrylic acid and any copolymers thereof. Suitable polymers are, for example, copolymers with vinylimidazole or acrylonitrile. The polymers can again be partially fluorinated or perfluorinated.

Suitable additional polymers comprising phosphonic acid groups, i.e. polymers comprising phosphonic acid groups which can be used in addition to the polymers of the invention, are, for example, polyvinylphosphonic acid, polybenzimidazolephosphonic acid, phosphonated polyphenylene oxides, e.g. poly-2,6-dimethylphenylene oxides, etc. The polymers can be partially fluorinated or perfluorinated.

Furthermore, the polymeric aromatic phosphonic acid of the invention or the polymeric aromatic phosphonate of the invention can be used together with acid/base blends as disclosed, for example, in WO 99/54389 and WO 00/09588. These are generally polymer blends comprising a polymer comprising sulfonic acid groups and a polymer bearing primary, secondary or tertiary amino groups, as are disclosed in WO 99/54389, or polymer blends obtained by mixing polymers which comprise basic groups in the side chain with polymers comprising sulfonate, phosphonate, or carboxylate groups (acid or salt form). Suitable polymers comprising sulfonate, phosphonate or carboxylate groups have been mentioned above (see polymers comprising sulfonic acid, carboxylic acid or phosphonic acid groups). Polymers which comprise basic groups in the side chain are polymers which are obtained by side chain modification of aryl main chain engineering polymers which have arylene-comprising N-basic groups and can be deprotonated by means of organometallic compounds, whereby aromatic ketones and aldehydes comprising tertiary basic N groups (e.g. tertiary amine or basic N-comprising heterocyclic aromatic compounds such as pyridine, pyrimidine, triazine, imidazole, pyrazole, triazole, thiazole, oxazole, etc.) are linked with the metallated polymer. Here, the metal alkoxide formed as intermediate can, in a further step, either be protonated by means of water or etherified by means of haloalkanes (WO 0/09588).

It is likewise possible for the polymeric aromatic phosphonic acids and/or polymeric aromatic phosphonates of the invention to be used together with a plurality of the abovementioned functionalized polymers. In addition, the blends can additionally comprise one or more unfunctionalized polymers. Suitable unfunctionalized polymers have likewise been mentioned above.

Particularly preferred functionalized polymers used as blend partners are polymers comprising sulfonic acid groups, with suitable polymers comprising sulfonic acid groups having been mentioned above. Very particular preference is given to blends comprising at least one polymeric aromatic phosphonic acid according to the invention and/or at least one polymeric aromatic phosphonate according to the invention and at least one functionalized, preferably sulfonated, polymer. Very particularly preferred sulfonated polymers are selected from the group consisting of sulfonated poly(ether ether ketone), poly(phenyl sulfone), poly(sulfone) and poly(ether sulfone). Further functionalized polymers which are preferably used as blend partners are the basic polymers poly(benzimidazole), poly(p-phenylquinoxaline) or mixtures thereof and also derivatives thereof. These can form acid/base blends with the polymeric aromatic phosphonates or phosphonic acids of the invention.

The polymer blends generally comprise from 0.1 to 95% by weight, preferably from 1 to 25% by weight, of the polymeric aromatic phosphonic acid of the invention or the aromatic phosphonate of the invention and generally from 99.9 to 5% by weight, preferably from 75 to 99% by weight, of at least one further polymer.

The present invention therefore further provides blends comprising at least one polymeric aromatic phosphonic acid according to the invention and/or at least one polymeric aromatic phosphonate according to the invention and at least one further polymer, preferably at least one further functionalized polymer.

Preferred polymeric aromatic phosphonic acids and phosphonates and preferred further polymers have been mentioned above.

It has surprisingly been found that when blends of at least one polymeric aromatic phosphonic acid according to the invention and/or at least one polymeric aromatic phosphonate according to the invention and at least one further functionalized polymer are used, membranes having excellent ion conductivity and fuel cells having excellent performance which goes beyond the expected summation of the individual performances of the functionalized polymers mentioned are obtained.

Membranes comprising at least one polymeric aromatic phosphonic acid and/or at least one polymeric aromatic phosphonate according to the present invention can be produced by methods known to those skilled in the art. Suitable methods are described, for example, in U.S. Pat. No. 6,828,407 B2.

A preferred process for producing membranes comprising at least one polymeric aromatic phosphonic acid according to the invention or at least one aromatic phosphonate according to the invention (hereinafter referred to as phosphonic-acid aromatic polymers) is described below.

Phosphonic-acid polyelectrolyte membranes comprising the phosphonic-acid aromatic polymers of the invention are generally produced by dissolution of the phosphonic-acid polyelectrolyte in an organic solvent, application of the preferably filtered solution or mixture to a suitable surface or impregnation of a support material with the same and subsequent partial to complete evaporation of the solvent. The addition of soluble or homogeneously dispersable additives such as further polyelectrolytes, stabilizers, fillers and perogens such as poly(ethylene oxide), poly(propylene oxide), poly(vinyl alcohol) to the preferably filtered polymer solution and their subsequent processing to form a membrane is also possible. The choice of solvent is restricted only by a suitable solvent power and inertness in respect of the phosphonic-acid aromatic polymer and comprises chlorinated hydrocarbons such as dichloromethane, chloroform and carbon tetrachloride, 1,2-dichloroethane, chlorobenzene and dichlorobenzene, ethers such as diethyl ether, tetrahydrofuran and dioxane, alkylene glycol alkyl ethers such as ethylene glycol methyl ether, ethylene glycol ethyl ether and propylene glycol methyl ether, alcohols such as methanol, ethanol and propanol and also the preferred, aprotic, polar liquids of the amide type, e.g. N,N-dimethylformamide, N,N-dimethylacetamide and N-methylpyrrolidone, with particular preference being given to N-methylpyrrolidone, and also mixtures of these solvents.

An improvement in the solubility, particularly of highly functionalized phosphonic-acid aromatic polymers, in organic solvents can be achieved, for example, by addition of 0.05-2% by volume of a strong acid to the solvent, as long as this does not hinder the formation of a homogeneous solution. Acids used are concentrated aqueous hydrogen halide solutions, e.g. HCl or HBr, or concentrated sulfuric acid or nitric acid or strong organic acids such as alkylsulfonic acids and trifluoroacetic acid.

Possible surfaces for application of the polymer solutions are, for example, glass, glasses and plastic films which have been hydrophobicized by silanation, plastic meshes as support materials, porous polymer membranes and other substrates suitable for reinforcement, flexibilization and increasing the toughness.

After application of the polymer solution to the surface as described above or impregnation of the substrate as described above, the solvent is completely or partly removed by evaporation at temperatures of generally 0-150° C. If the solvent is very largely removed by means of a sufficient drying temperature and time, a homogeneous membrane without morphological structuring is generally obtained.

The residual amount of the solvent in the film can be influenced by choice of drying temperature and time. Surface-porous, unsymmetrical membrane morphologies can be produced by dipping a film or composite comprising residual solvent into a precipitation bath which is miscible with the solvent but incompatible with the polyelectrolyte. The characteristics and morphology of the porous structuring produced thereby can be influenced by the residual solvent content, the choice of precipitation bath and its temperature.

The membrane structures produced can be used for increasing the surface area required for taking up ions or contacting the membrane with an electrode layer and also as microscopic hollow spaces for precipitation of polymeric or low molecular weight substances which have a positive influence on the proton conductivity, e.g. acidic polyelectrolytes or zirconium(IV) phosphates, zirconium(IV) phosphonates and zirconium(IV) sulfonephosphonates, silicates which promote water retention at elevated temperature or acid-functionalized silicates, as long as the chemical resistance and mechanical strength, flexibility and separating power of the membrane are not adversely affected.

The thickness of the membrane produced can be influenced by the concentration of the polymer electrolyte solution used, the layer thickness of the polymer solution applied and also the thickness of the support material used, with a very thin membrane being preferred in order to increase the proton conductivity. A preferred membrane thickness for use as fuel cell membrane is 1-200 μm and is selected so that a very high proton conductivity results at an appropriate mechanical strength and diffusion barrier action.

The present invention therefore further provides membranes, films or composites comprising at least one polymeric aromatic phosphonic acid or at least one polymeric aromatic phosphonate according to the present invention or a blend according to the invention comprising at least one aromatic phosphonic acid according to the invention or at least one aromatic phosphonate according to the invention and at least one further polymer.

Preferred polymeric aromatic phosphonic acids, preferred polymeric aromatic phosphonates and preferred further polymers have been mentioned above.

These membranes can be used in fuel cells and as membranes in separation technology, preferably as selectively permeable membranes in the desalination of water, wastewater purification, dialysis and in ion extraction and retention.

The present invention further provides a fuel cell comprising at least one membrane according to the invention or at least one polymeric aromatic phosphonic acid or at least one polymeric aromatic phosphonate or blends according to the present invention.

Furthermore, the present invention provides for the use of the membranes of the invention in fuel cells.

A further application of the phosphonic-acid polyelectrolytes of the invention (i.e. the polymeric aromatic phosphonic acids or phosphonates of the invention or blends with further polymers) is the reduction of swelling of aromatic polyphosphonic acid membranes and polyelectrolyte-polyphosphonic acid blend membranes via ionically crosslinking in-situ formation of zirconium(IV) polyphosphonates, by action of Zr(IV) salt solutions, in particular aqueous zirconyl chloride, on such membranes.

It has surprisingly been found that the treatment of membranes of the phosphonic-acid polyelectrolytes of the invention (i.e. the polymeric aromatic phosphonic acids or phosphonates of the invention or blends with further polymers), in particular of blend membranes (comprising the abovementioned blends), with aqueous Zr(IV) salt solutions, in particular $ZrOCl_2$ solutions, brings about a considerable reduction in swelling with simultaneous retention of the conductivity.

The present invention therefore further provides for the use of the polymeric aromatic phosphonic acids or phosphonates of the invention for reducing swelling of aromatic polyphosphonic acid membranes and polyelectrolyte-polyphosphonic acid blend membranes via ionically crosslinking in-situ formation of zirconium(IV) polyphosphonates, and also aromatic polyphosphonic acid membranes and polyelectrolyte-polyphosphonic acid blend membranes comprising zirconium(IV) polyphosphonates.

The polyelectrolytes of the invention can likewise serve as nonmigrating polyphosphonic acid component in blend membranes with basic nitrogen-comprising aromatic polymers such as poly(benzimidazole) or poly(p-phenylquinoxaline).

Further applications of the phosphonic-acid polyelectrolytes of the invention are aiding or improving contact between apatite surfaces of teeth or bones and plastic or metal implants. Here, the polyphosphonic acid material can be used in pure form, as a mixture with various additives and as a property-improving constituent of a blend.

Furthermore, the polyphosphonic acids or phosphonates of the invention can serve as corrosion-inhibiting metal coatings or as bonding layer between a metal surface and further materials.

The following examples illustrate the invention:

EXAMPLES

Example 1

Preparation of a Phosphonic-acid Polyelectrolyte Based on the Poly(Sulfone) ULTRASON® S (Substance P1)

Preparation of the Brominated Precursor br-P1

100 g (225.97 mmol of bisphenol A units) of the poly (sulfone) ULTRASON® S, henceforth referred to as P1, are dissolved by stirring in 400 ml of chloroform for 20 minutes in a 1000 ml three-neck flask provided with reflux condenser, dropping funnel and stirrer in an oil bath heated to 70° C. A solution of 58 g (362.7 mmol) of bromine in 100 ml of chloroform is allowed to run into the resulting pale beige and slightly opaque solution while stirring rapidly. The intensively reddish brown, homogeneous mixture is stirred further at 70° C. and the HBr evolved is trapped by passing into aqueous alkali.

After 3 hours, the distinctly decolorized mixture is precipitated by pouring quickly into a vigorously stirred 2.5 l of a 4:1 (v/v) mixture of methanol/acetone at 20° C. After stirring for 5 minutes, the precipitant is decanted off, replaced by 1.5 l of an identical mixture and the polymer is broken up mechanically in this.

The white flocs obtained are purified by Soxhlet extraction with pure methanol over KOH for 24 hours and are subsequently dried at 10° C. under reduced pressure for 24 hours.

The product obtained will henceforth be referred to as br-P1.

Yield: 118.32 g
Elemental Analysis:

| C: | 61.85% (calc.) | 61.13% (found) |
|---|---|---|
| H: | 4.00% (calc.) | 3.98% (found) |
| S: | 6.12% (calc.) | 6.34% (found) |

Given $ds_{Br}=410.5943/w(C)-5.6082$, it follows that $ds_{Br}=110.9$ mol %, corresponding to 1.11 bromine atoms per bisphenol A unit, i.e. per repeating unit.

$^1$H-NMR spectrum (300 MHz, CDCl$_3$):
1.69 ppm, integrated value=1 (i-propylidene H$_{alk}$)
6.94-7.87 ppm, integrated value=2.83 (Ar—H)

Preparation of the Phosphonic-acid Polymer pho-P1

10 g of br-P1 (20.94 mmol of bromine) together with 270 mg (2.09 mmol, corresponding to 0.1 molar equivalent based on the bromine content) of anhydrous Ni(II) chloride are introduced into a 250 ml three-neck flask provided with stirrer, air condenser with attached cold trap and dropping funnel closed with a septum and provided with a nitrogen inlet. In an oil bath heated to 190° C., the mixture is freed of residual moisture by passing a slow stream of nitrogen into it. 3 g of diphenyl ether are added in a countercurrent of N$_2$ to the dry mixture and the polymer is processed by stirring for 1 hour to give a homogeneous, viscous, light-beige solution. After the oil bath temperature has been increased to 200° C., 6.55 g (26.2 mmol) of tributyl phosphite is introduced into the dropping funnel via the septum and this is added to the mixture over a period of 30 minutes while stirring. About 3 minutes after commencement of the addition, a color change through dark red to purple is observed. After about 5 minutes, a colorless liquid (identified as bromobutane by NMR spectroscopy) is driven off by the stream of N$_2$ with sudden vigorous foaming and brief dark blue coloration. Over the course of the next ½ h, about 5 ml of this liquid are condensed in the cold trap, while the reaction mixture gels and becomes black. The stirrer is switched off and the mixture is heated at 180° C. for 8 hours.

After cooling to room temperature, the mixture is freed of diphenyl ether and nickel by treatment with ultrasound and 250 ml of a 100:50:2 (v/v/v) mixture of methanol/acetone/hydrochloric acid. The viscous paste-like product obtained is broken up mechanically and Soxhlet-extracted with methanol over KOH for 12 hours.

Drying at 75° C. under reduced pressure gives a compact, light-beige material. This is found to be readily soluble in warm N-methylpyrrolidone to form a light-beige, conspicuously viscous solution. On addition of a few drops of a 1% strength (m/m) zirconium(IV) acetylacetonate/N-methylpyrrolidone solution, a whitish precipitate of zirconium(IV) polyphosphonic acid which is insoluble in dimethyl sulfoxide, N,N-dimethylformamide, N,N-dimethylacetamide and trifluoroacetic acid can be precipitated. A corresponding precipitation is not observed for N-methylpyrrolidone solutions of P1 and br-P1.

An $^1$H— and $^{31}$P-NMR spectrum is recorded on the product obtained, which is hereinafter referred to as pho-P1.

Yield: 9.30 g

Determination of the bromine content: oxidative digestion of pho-P1.1 with KNO$_3$/NaO$_2$ and titration with AgNO$_3$ solution and backtitration with FeSCN solution indicates a bromine content below the detection limit of 0.3% by weight.

$^1$H-NMR spectrum of pho-P1 (300 MHz, d$_6$-dimethyl sulfoxide):
0.65-0.70 ppm, integrated value 1.48 (ester CH$_3$)
1.05-1.08 ppm, integrated value 0.92 (ester CH$_2$)
1.26-1.28 ppm, integrated value 1.05 (ester CH$_2$)
1.62-1.64 ppm, integrated value 1.58 (i-propylidene CH$_3$)
3.67-3.82 ppm, integrated value 1.00 (ester CH$_2$)
6.97-7.87 ppm, integrated value 4.26 (Ar—H)

The ratio of the normalized integrals of butyl CH$_3$ to i-propylidene CH$_3$ gives a degree of phosphonylation of 93.7 mol %, corresponding to 0.9 dibutyl phosphonate group per bisphenol A unit, i.e. per repeating unit.

$^{31}$P-NMR spectrum of pho-P1 (121.5 MHz, 300 MHz H decoupling, d$_6$-dimethyl sulfoxide):
16.8 ppm (aromatic dibutyl phosphonate)

Preparation of the Phosphonic-acid Polymer pho-P1.1

Using the procedure described under pho-P1, 10 g of br-P1 (20.94 mmol of bromine) are reacted with 125 mg (1.05 mmol, corresponding to 0.05 molar equivalent based on the bromine content) of anhydrous Ni(II) chloride and 6.55 g (26.2 mmol) of tributyl phosphite.

Work-up gives a compact, light-beige material which is found to be readily soluble in warm N-methylpyrrolidone and on addition of a few drops of 1% strength (m/m) zirconium (IV) acetylacetonate/N-methylpyrrolidone solution forms an insoluble precipitate of zirconium(IV)-polyphosphonic acid.

An $^1$H— and $^{31}$P-NMR spectrum is recorded on the product obtained, which will hereinafter be referred to as pho-P1.1.

Yield: 9.30 g

Determination of the bromine content: oxidative digestion of pho-P1 with KNO$_3$/NaO$_2$ and titration with AgNO$_3$ solution and backtitration with FeSCN solution indicates a bromine content below the detection limit of 0.3% by weight.

$^1$H-NMR spectrum of pho-P1.1 (300 MHz, d$_6$-dimethyl sulfoxide):
0.65-0.70 ppm, integrated value 1.48 (ester CH$_3$)
1.05-1.08 ppm, integrated value 0.92 (ester CH$_2$)
1.26-1.28 ppm, integrated value 1.05 (ester CH$_2$)
1.62-1.64 ppm, integrated value 1.58 (i-propylidene CH$_3$)
3.67-3.82 ppm, integrated value 1.00 (ester CH$_2$)
6.97-7.87 ppm, integrated value 4.26 (Ar—H)

The ratio of the normalized integrals of butyl CH$_3$ to i-propylidene CH$_3$ gives a degree of phosphonylation of 97.3 mol %, corresponding to 0.98 dibutyl phosphonate group per bisphenol A unit, i.e. per repeating unit.

$^{31}$P-NMR spectrum of pho-P1.1 (121.5 MHz, 300 MHz H decoupling, d$_6$-dimethyl sulfoxide):
16.8 ppm (aromatic dibutyl phosphonate)

Example 1.1

Preparation of a Phosphonic-acid Polyelectrolyte Based on the Poly(Sulfone) ULTRASON® S (Substance P1.2)

Preparation of the Brominated Precursor br-P1.2

100 g (225.97 mmol of bisphenol A units) of P1 are reacted with 75 g (469.04 mmol) of bromine in 100 ml of chloroform and worked up as described for br-P1.

The compact, pure white product obtained will henceforth be referred to as br-P1.2.

Yield of br-P1.2: 123.7 g
Elemental Analysis of br-P1.2:

| | | |
|---|---|---|
| C: | 59.17% (calc.) | 58.70% (found) |
| H: | 3.78% (calc.) | 3.75% (found) |
| S: | 5.86% (calc.) | 5.97% (found) |

Given that $ds_{Br}=410.5943/w(C)-5.6082$, it follows that $ds_{Br}=138.7$ mol %, corresponding to 1.39 bromine atoms per bisphenol A unit.

$^1$H-NMR Spectrum of brP1.2 (300 MHz, CDCl$_3$):
1.59 ppm, integrated value=1 (i-propylidene H$_{alk}$)
6.87-7.76 ppm, integrated value=2.46 (Ar—H)

Preparation of the Phosphonic-acid Polymer pho-P1.2

10 g of br-P1.2 (25.13 mmol of bromine) together with 325 mg (2.513 mmol, corresponding to 0.1 molar equivalent based on the bromine content) of anhydrous Ni(II) chloride are placed in a 250 ml three-neck flask provided with stirrer, air condenser with attached cold trap and dropping funnel closed with a septum and provided with a nitrogen inlet. Reaction with 5.22 g (31.41 mmol) of triethyl phosphite and work-up are carried out as described for pho-P1.

A compact, light-beige material is obtained. This is found to be highly swellable but not homogeneously soluble in warm N-methylpyrrolidone. Addition of about 2% by volume of concentrated HBr enables distinctly greater swelling but no formation of a solution to be achieved.

An $^1$H— and $^{31}$P-NMR spectrum is recorded on a swollen sample of the product obtained, which will hereinafter be referred to as pho-P1.2, in d$_6$-DMSO.

Yield of phoP1.2: 9.15 g

Determination of the bromine content: oxidative digestion of pho-P1.2 with KNO$_3$/NaO$_2$ and titration with AgNO$_3$ solution and backtitration with FeSCN solution indicates a bromine content below the detection limit of 0.3% by weight.

$^1$H-NMR spectrum of pho-P1.2 (300 MHz, d$_6$-dimethyl sulfoxide):
0.90-1.00 ppm, integrated value 1.00 (ester CH$_3$)
1.63-1.66 ppm, integrated value 0.75 (i-propylidene CH$_3$)
3.78-3.88 ppm, integrated value 0.68 (ester CH$_2$)
6.97-7.90 ppm, integrated value 2.11 (Ar—H)

The ratio of the normalized integrals of ethyl CH$_3$ to i-propylidene CH$_3$ gives a degree of phosphonylation of 132.6 mol %, corresponding to 1.33 diethyl phosphonate groups per bisphenol A unit, i.e. per repeating unit.

$^{31}$P-NMR spectrum of pho-P1.2 (121.5 MHz, 300 MHz H decoupling, d$_6$-dimethyl sulfoxide):
16.8 ppm (aromatic dibutyl phosphonate)

Example 2

Preparation of a Phosphonic-acid Poly(Electrolyte) Based on the Poly(Ether Sulfone) ULTRASON® E (Substance P2)

Preparation of the Brominated Precursor br-P2

100 g (861.2 mmol of phenyl functions) of the poly(ether sulfone) ULTRASON® E from BASF AG, henceforth referred to as P2, are dissolved in 600 ml of concentrated (95-98%) sulfuric acid in a 1000 ml two-neck flask provided with dropping funnel and stirrer at room temperature for 4 hours. A solution of 30.9 g (215.43 mmol of active bromine) of dibromoisocyanuric acid in 300 ml of concentrated (95-98%) sulfuric acid is added to the resulting pale beige, transparent solution while stirring rapidly. After a few minutes, a light-beige fine precipitate precipitates out. After stirring at room temperature for 3 hours, the mixture is precipitated in 5000 ml of distilled water while stirring and cooling in ice and the solid is washed free of acid by repeated replacement of the precipitant. The white polymer threads obtained are broken up mechanically and Soxhlet-extracted with methanol over KOH for 24 hours.

Drying at 100° C. under reduced pressure for 12 hours gives compact white flocs.

Yield: 115.8 g of white flocs and rods
Elemental Analysis:

| | | |
|---|---|---|
| C: | 53.00% (calc.) | 52.95% (found) |
| H: | 3.50% (calc.) | 2.82% (found) |
| S: | 12.20% (calc.) | 11.88% (found) |
| N: | 0.00% (calc.) | 0.00 (found) |

Given that $ds_{Br}=182.4863/w(C)-2.9433$, it follows that $ds_{Br}=49.7$ mol %, corresponding to 0.5 bromine atom per repeating unit.

$^1$H-NMR spectrum of br-P2 (300 MHz, d$_6$-dimethyl sulfoxide):
7.23-7.27 ppm, integrated value 4.17 (Ar—H)
7.31-7.38 ppm, integrated value 0.34 (Ar—H)
7.98-7.99 ppm, integrated value 3.57 (Ar—H)
8.03-8.05 ppm, integrated value 1.00 (Ar—H)
8.34-8.45 ppm, integrated value 0.72 (Ar—H)

Preparation of the Phosphonic-acid Polymer pho-P2

27.5 g of the brominated precursor br-P2 (50.6 mmol of bromine) and 1.31 g (10.1 mmol) of anhydrous Ni(II) chloride are placed in a 100 ml three-neck flask provided with stirrer, open air condenser and dropping funnel closed with a septum and provided with a nitrogen inlet. In an oil bath heated to 190° C., the mixture is freed of residual moisture by passing a slow stream of nitrogen into it. 30 g of benzophenone are added in a countercurrent of N$_2$ to the dry mixture and the polymer is processed by stirring for 1 hour to give a highly viscous, light-brown solution. After the oil bath temperature has been increased to 200° C., 16.8 g (101.2 mmol) of triethyl phosphite are introduced into the dropping funnel via the septum and this is added to the mixture over a period of 30 minutes while stirring. About 2 minutes after commencement of the addition, a color change through purple to dark blue is observed with vigorous foaming of the mixture and a colorless liquid is driven off into a cold trap by the N$_2$ stream with vigorous reflux. After about a further 30 seconds, the mixture gels and becomes black. The stirrer is switched off and the mixture is heated at 170° C. for 8 hours.

After cooling to room temperature, a sample is taken and this is freed of catalyst residues, benzophenone, bromoethane and residual triethyl phosphite by treatment with ultrasound and 3×10 ml of isohexane. An $^1$H spectrum in d$_6$-dimethyl sulfoxide is recorded on the beige sample obtained after removal of the extractant by drying at 100° C. in a stream of nitrogen, hereinafter referred to as pho-P2. The remaining mixture is freed of benzophenone by treatment with ultrasound and 250 ml of a 100:2 (v/v) mixture of methanol/hydrochloric acid.

Drying at 75° C. under reduced pressure gives a compact, light-beige material. This is found to be soluble in warm N-methylpyrrolidone to form a light-beige, conspicuously viscous solution. On addition of a few drops of a 1% strength (m/m) Zr (acetylacetonate)$_4$/N-methylpyrrolidone solution, a whitish precipitate of Zr(IV) polyphosphonate which is insoluble in dimethyl sulfoxide, N,N-dimethylformamide, N,N-dimethylacetamide, trifluoroacetic acid and sulfuric acid can be precipitated. A corresponding precipitation is not observed for N-methylpyrrolidone solutions of P2 and br-P2.

Yield: 26.4 g of a light-beige compact material.

Determination of the bromine content: oxidative digestion of pho-P2 with KNO$_3$/NaO$_2$ and titration with AgNO$_3$ solution and backtitration with FeSCN solution indicates a bromine content below the detection limit of 0.3% by weight.

$^1$H-NMR spectrum of pho-P2 (300 MHz, d$_6$-dimethyl sulfoxide):
1.05-1.08 ppm, integrated value 0.21 (ester CH$_3$)
4.00-4.03 ppm, integrated value 0.15 (ester CH$_2$)
7.25-7.96 ppm, integrated value 1.00 (Ar—H)

The ratio of the integrals x=integral of (ethyl CH$_3$)/integral of (aryl H)=0.21 gives, for a degree of phosphonylation ds(P)=8x/(6+x), a degree of phosphonylation of 27.1 mol %, corresponding to 0.27 diethyl phosphonate group per repeating monomer unit.

$^{31}$P-NMR spectrum of pho-P2 (121.5 MHz, 300 MHz H decoupling, d$_6$-dimethyl sulfoxide):
16.5 ppm (aromatic diethyl phosphonate)

Example 3

Preparation of a Phosphonic-acid Poly(Electrolyte) Based on the Poly(Ether Ether Ketone) VICTREX® 450 P (Substance P3)

Preparation of the Brominated Precursor br-P3

25 g (86.71 mmol of repeating units) of the poly(ether ether ketone) VICTREX® 450 P, henceforth referred to as P3, are dissolved in 200 ml of pure methanesulfonic acid in a 250 ml two-neck flask provided with dropping funnel and stirrer at 50° C. for 8 hours. A solution of 11.58 g (65.03 mmol of active bromine) of N-bromosuccinimide in 25 ml of pure methanesulfonic acid is added from the dropping funnel to the resulting dark orange, highly viscous solution while stirring rapidly. After stirring at 50° C. for 24 hours, the mixture is precipitated in 1000 ml of distilled water while cooling in ice and the solid is washed free of acid by repeated replacement of the precipitant. The light-gray polymer threads obtained are broken up mechanically and Soxhlet-extracted with methanol over KOH for 24 hours.

Drying at 10° C. under reduced pressure for 12 hours gives light-gray rods.

An $^1$H-NMR spectrum of the product obtained, henceforth referred to as br-P3, is recorded in trifluoromethanesulfonic acid solution using an external d$_6$-acetone lock.

Yield: 29.84 g

Elemental Analysis:

| C: | 66.21% (calc.) | 66.01% (found) |
| H: | 3.28% (calc.) | 3.22% (found) |
| S: | 0.00% (calc.) | 0.00% (found) |
| N: | 0.00% (calc.) | 0.00% (found) |

At ds$_{Br}$=288.937/w(C)−3.654, a ds$_{Br}$ of 72.5 mol %, corresponding to 0.73 bromine atom per repeating unit, is obtained.

$^1$H-NMR spectrum of br-P3 with external d$_6$-DMSO lock (300 MHz, trifluoromethanesulfonic acid):
6.70 ppm, integrated value 0.37 (Ar—H)
6.90 ppm, integrated value 22.08 (Ar—H)
7.17 ppm, integrated value 0.86 (Ar—H)
7.54 ppm, integrated value 0.66 (Ar—H)
7.71 ppm, integrated value 10.55 (Ar—H)
7.97 ppm, integrated value 1.00 (Ar—H)

Comparison of the signal positions and number of signals in $^1$H-NMR spectra of br-P3 and P3 shows the substitution both of the p-oxyphenoxy rings and the p-oxyphenonyl rings of the repeating unit.

Preparation of the Phosphonic-acid Polymer pho-P3

10 g of the brominated precursor br-P3 (20.96 mmol of bromine) together with 272 mg (2.10 mmol, corresponding to 0.1 molar equivalent based on the bromine content) of anhydrous Ni(II) chloride are placed in a 250 ml three-neck flask provided with stirrer, open air condenser and dropping funnel closed with a septum and provided with a nitrogen inlet. In an oil bath heated to 220° C., the mixture is freed of residual moisture by passing a slow stream of nitrogen into it. 22 g of benzophenone are added in a countercurrent of N2 to the dry mixture and the polymer is processed by stirring for 1 hour to give a homogeneous, light-beige solution. After the oil bath temperature has been increased to 200° C., 21.2 g (128 mmol) of triethyl phosphite is introduced into the dropping funnel via the septum and this is added to the mixture over a period of 30 minutes while stirring. After addition of about 9.5 ml of phosphite, a color change through purple to dark blue with vigorous foaming of the mixture is observed and a colorless liquid is driven off by the stream of N$_2$ into a cold trap with vigorous reflux. After about a further 30 seconds, the mixture gels and becomes black. After the phosphite addition is complete, the stirrer is switched off and the mixture is heated at 170° C. for 8 hours.

After cooling to room temperature, a sample is freed of benzophenone, catalyst residues, bromoethane and residual triethyl phosphite by treatment with ultrasound and 3×10 ml of methanol. An $^1$H-NMR spectrum of the gray-brown sample obtained after removal of the extractant by drying at 100° C. in a stream of nitrogen, hereinafter referred to as pho-P3, is recorded in trifluoromethanesulfonic acid using an external d$_6$-dimethyl sulfoxide lock signal. The remaining mixture is broken up mechanically and Soxhlet-extracted with a 100:1 (v:v) methanol/hydrochloric acid mixture for 12 hours. Drying at 75° C. under reduced pressure gives a compact, light-beige material. The product obtained will hereinafter be referred to as pho-P3.

Yield: 10.24 g

Determination of the bromine content: oxidative digestion of pho-P3 with KNO$_3$/NaO$_2$ and titration with AgNO$_3$ solution and backtitration with FeSCN solution indicates a bromine content below the detection limit of 0.3% by weight. Thermogravimetric analysis of phoP3 (Netzsch STA 409, heating rate: 10 K/min, air atmosphere):

5% loss in weight at 330° C.
25% loss in weight at 449° C.
63.7% loss in weight at 600° C.

The stepwise loss in mass in the range 250-350° C. of 9.1% by weight resulting from phosphonic ester pyrolysis with elimination of ethene corresponds, given a degree of phosphonylation ds(P)=288.31*(loss in mass/100)/(56.106–loss in mass/100)*136.1, to a degree of phosphonylation of 63.7 mol %, corresponding to 0.64 diethyl phosphonate group per repeating monomer unit.

Since the product is found to be soluble only in trifluoromethanesulfonic acid which acidolytically cleaves the phosphonic ester groups, no solution NMP spectrum of the sample can be obtained in order to determine the degree of phosphonylation.

Example 3.1

Preparation of a Phosphonic-acid Poly(Electrolyte) Based on the Poly(Ether Ether Ketone) VICTREX 450 P (Substance P3)

Preparation of the Brominated Precursor br-P3.1

20 g (69.37 mmol of repeating units) of P3 are reacted with 37.04 g (208.1 mmol of active bromine) of N-bromosuccinimide as described for br-P3, with the polymer precipitating as a viscoelastic mass about 45 minutes after addition of the NBS solution. Work-up is carried out by washing with water, breaking up the polymer mechanically and subjecting it to a Soxhlet extraction with methanol for 24 hours.

Light-gray, fibrous rods which dissolved homogeneously in chloroform, NMP, DMAc and DMF at room temperature and at 120° C. in dimethyl sulfoxide, N-methylpyrrolidone and chloroform are obtained. Films produced from a 17.5% strength by weight chloroform solution will withstand folding and mechanical stress.

An $^1$H-NMR spectrum of the product obtained, henceforth referred to as br-P3.1, is recorded in $d_1$-chloroform solution.

Yield of br-P3.1: 32.3 g
Elemental Analysis of br-P3.1:

| C: | 48.94% (calc.) | 47.76% (found) |
|---|---|---|
| H: | 2.09% (calc.) | 2.13% (found) |
| S: | 0.00% (calc.) | 0.00% (found) |
| N: | 0.00% (calc.) | 0.00% (found) |

At $ds_{Br}$=288.937/w(C)–3.654, a $ds_{Br}$=239.5 mol %, corresponding to 2.4 bromine atoms per repeating unit, is obtained.
$^1$H-NMR spectrum of br-P3.1 (300 MHz, $d_1$-chloroform):
6.75-7.18 ppm, integrated value 4.52 (Ar—H)
7.35-7.45 ppm, integrated value 0.86 (Ar—H)
7.62-7.88 ppm, integrated value 2.80 (Ar—H)
8.00-8.18 ppm, integrated value 0.66 (Ar—H)

Comparison of the signal positions and number of signals in $^1$H-NMR spectra of br-P3 and P3 shows the substitution both of the p-oxyphenoxy rings and the p-oxyphenonyl rings of the repeating unit.
Preparation of the Phosphonic-acid Polymer pho-P3.1

10 g of the brominated precursor br-P3 (50 mmol of bromine) together with 650 mg (5 mmol, corresponding to 0.1 molar equivalent based on the bromine content) of anhydrous Ni(II) chloride are reacted in 10 g of benzophenone with 15.7 g (62.72 mmol) of tributyl phosphite as described under phoP3.

Cooling and work-up gives a compact, light-beige material. The product obtained will hereinafter be referred to as pho-P3.1 and is found to be soluble in warm NMP with addition of about 2% by volume of concentrated HBr. The product swells sufficiently in DMSO for an NMR spectrum to be able to be recorded.

Yield of phoP3.1: 10.8 g

Determination of the bromine content of phoP3.1: oxidative digestion of pho-P3.1 with $KNO_3/NaO_2$ and titration with $AgNO_3$ solution and backtitration with FeSCN solution indicates a bromine content below the detection limit of 0.3% by weight.

Elemental Analysis of phoP3.1:

| C: | 59.56% (calc.) | 60.15% (found) |
|---|---|---|
| H: | 7.04% (calc.) | 6.85% (found) |
| S: | 0.00% (calc.) | 0.00% (found) |

Given that $ds_P$=(288.31·w(C)/100–216)/(96–192.2·w(C)/100), it follows that $ds_P$=217 mol %, corresponding to 2.2 dibutyl phosphonate groups per recurring monomer unit.
Thermogravimetric analysis of phoP3.1 (Netzsch STA 409, heating rate: 10 K/min, air atmosphere):
5% loss in weight at 279° C.
25% loss in weight at 322° C.
50.1% loss in weight at 600° C.

The stepwise loss in mass in the range 225-350° C. of 29.6% by weight resulting from phosphonic ester pyrolysis with elimination of butene corresponds, given a degree of phosphonylation ds(P)=288.31*(loss in mass/100)/(112.22–loss in mass)*192.2, to a degree of phosphonylation of 153.0 mol %, corresponding to 1.53 dibutylphosphonate groups per repeating monomer unit.
$^1$H-NMR spectrum of pho-P3.1 (300 MHz, $d_6$-DMSO):
0.3-0.7 ppm, integrated value 3.1 (alkyl $CH_3$)
0.7-1.8 ppm, integrated value 2.3 (alkyl $CH_2$)
3.5-4.4 ppm, integrated value 2.1 (alkyl $CH_2$)
5.1-6.0 ppm, integrated value 2.0 (O—$CH_2$)
6.4-8.4 ppm, integrated value 3.1 (Ar—H)

The ratio of the integrals x=integral of (butyl $CH_3$)/integral of (aryl H)=1.0 gives, at a degree of phosphonylation ds(P)=12x/(6+x), a degree of phosphonylation of 171 mol %, corresponding to 1.7 butyl phosphonate groups per repeating monomer unit.

The invention claimed is:

1. A process for preparing a polymeric aromatic phosphonate, wherein the content of halogen is less than 0.5% by weight, based on the mass of the polymeric aromatic phosphonate, comprising reacting a halogenated polyarylene compound with a phosphorous ester in the presence of a catalyst comprising at least one metal selected from the group consisting of Ni and Pd, wherein the reaction is carried out in a nitrogen-free solvent at a temperature of from 150° C. to 250° C.

2. The process according to claim 1, wherein the polymeric aromatic phosphonate comprises units of the following formula I $$-[(O)_m\{R^1(Y)_o\}_pR^1]_r-[(O)_s-R^5]_v-$$

with $(X)_n$, $(X)_q$, $(X)_t$ substituents (I)

where:

X is —P(=O)(OR²)(OR³),

Y is carbonyl or sulfonyl,

R¹, R⁵ are, independently of one another, divalent or polyvalent aromatic radicals which may be substituted or unsubstituted and may comprise heteroatoms, m, o, s are each, independently of one another, 0 or 1, n, q, t are each, independently of one another, 0 or an integer, with n, q and t not simultaneously being 0, r, v are each, independently of one another, from 0 to 1, with the sum of r and v being from 0.95 to 1.05, p is 0 or an integer ≧1, R², R³ are each, independently of one another, alkyl, alkenyl, cycloalkyl, aralkyl, with the abovementioned groups being able to be substituted and/or being able to comprise heteroatoms.

3. The process according to claim 2, wherein R¹ and R⁵ are selected independently from the group consisting of 1,4-phenylene, 1,3-phenylene, 1,2-phenylene, 1,6-naphthylene, 2,4-naphthylene, 2,6-carbazole, 3-phenyl-1,4-arylene, 3-alkyl-1,4-arylene, 2-alkyl-1,4-arylene, 2-alkoxy-1,4-arylene, 3-alkoxy-1,4-arylene, 2,6-dimethyl-1,4-phenylene, 2,3,5,6-tetramethyl-1,4-phenylene, 4,4'-biphenylene, 3,3'-diphenyl-4,4'-biphenylene and arylenealkylene.

4. The process according to claim 1, wherein the halogenated polyarylene compound has the general formula II

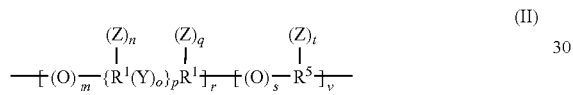
(II)

where

Z is halogen,

Y is carbonyl or sulfonyl,

R¹, R⁵ are, independently of one another, divalent or polyvalent aromatic radicals which may be substituted or unsubstituted and may comprise heteroatoms, m, o, s are each, independently of one another, 0 or 1, n, q, t are each, independently of one another, 0 or an integer, with n, q and t not simultaneously being 0, r, v are each, independently of one another, from 0 to 1, with the sum of r and v being from 0.95 to 1.05, p is 0 or an integer ≧1.

5. The process according to claim 1, wherein the phosphorous ester is an alkyl ester of phosphorous acid which has the general formula III

P(OR²)(OR³)(OR⁴)  (III)

where:

R², R³, R⁴ are each, independently of one another, alkyl, alkenyl, cycloalkyl, aralkyl, with the abovementioned groups being able to be substituted and/or being able to comprise heteroatoms.

6. The process according to claim 1, wherein the catalyst comprises Ni.

7. The process according to claim 1, wherein the catalyst is used in an amount of from 0.05 to <1 molar equivalent, based on the number of molar equivalents of the halogen in the halogenated polyarylene compound.

8. The process according to claim 1, wherein the nitrogen-free solvent is selected from the group consisting of diphenyl ether, benzophenone, diphenyl sulfone, the alkyl- or alkoxy-substituted derivatives of these compounds, aliphatic, partly aromatic, aromatic oligoethers and polyethers, aliphatic, partly aromatic, aromatic β-diketones, the alkyl-, aryl-, alkoxy- or aryloxy-substituted derivatives of these compounds, aliphatic, partly aromatic, aromatic keto ethers, aliphatic, partly aromatic, aromatic carboxylic acids, aliphatic, partly aromatic, aromatic carbonates and mixtures of the abovementioned compounds.

9. A process for preparing a polymeric aromatic phosphonate, wherein the content of halogen is less than 0.5% by weight, based on the mass of the polymeric aromatic phosphonate, which comprises:

i) halogenation of a polyarylene compound to give a halogenated polyarylene compound, and ii) reaction of the halogenated polyarylene compound with a phosphorous ester in the presence of a catalyst comprising at least one metal selected from the group consisting of Ni and Pd, with the reaction being carried out in a nitrogen-free solvent at a temperature of from 150° C. to 250° C.

10. The process according to claim 9, wherein the polyarylene compound used in i) has the general formula IV

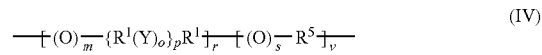
(IV)

where

Y is carbonyl or sulfonyl,

R¹, R⁵ are, independently of one another, divalent or polyvalent aromatic radicals which may be substituted or unsubstituted and may comprise heteroatoms, m, o, s are each, independently of one another, 0 or 1, r, v are each, independently of one another, from 0 to 1, with the sum of r and v being from 0.95 to 1.05, p is 0 or an integer ≧1.

11. A process for preparing a polymeric aromatic phosphonic acid, which comprises a) preparation of a polymeric aromatic phosphonate by the process according to claim 1, and b) ester cleavage of the polymeric aromatic phosphonate obtained.

12. The process according to claim 1, wherein the catalyst comprises Pd.

13. The process according to claim 1, wherein the content of halogen is less than 0.3% by weight, based on the mass of the polymeric aromatic phosphonate.

14. The process according to claim 1, wherein the polymeric aromatic phosphonate has a weight average molecular weight $M_w$ of 30000 to 90000 g/mol.

15. The process according to claim 1, wherein the Ni and Pd are present in the catalyst in an oxidation state of 0 to +2.

16. The process according to claim 15, wherein the catalyst comprising at least one metal selected from the group consisting of Ni and Pd is selected from the group consisting of salts of nickel and/or palladium.

17. The process according to claim 16, wherein the salts are chlorides, cyanides, and acetylacetonates of nickel and/or palladium.

18. The process according to claim 16, wherein the salts are nickel(II) salts.

19. The process according to claim 1, wherein the polymeric aromatic phosphonate has a weight average molecular weight $M_w$ of 30000 to 90000 g/mol, the phosphorous ester is selected from the group consisting of triethyl phosphite and tributyl phosphite, and the catalyst comprising at least one metal selected from the group consisting of Ni and Pd is a nickel(II) salt.

20. The process according to claim 2, wherein the halogenated polyarylene compound has the general formula II

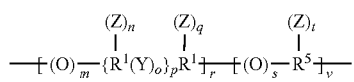 (II)

where
Z is halogen,
Y is carbonyl or sulfonyl,
$R^1$, $R^5$ are, independently of one another, divalent or polyvalent aromatic radicals which may be substituted or unsubstituted and may comprise heteroatoms,
m, o, s are each, independently of one another, 0 or 1,
n, q, t are each, independently of one another, 0 or an integer, with n, q and t not simultaneously being 0,
r, v are each, independently of one another, from 0 to 1, with the sum of r and v being from 0.95 to 1.05,
p is 0 or an integer $\geqq 1$,
and the phosphorous ester is an alkyl ester of phosphorous acid which has the general formula III $P(OR^2)(OR^3)(OR^4)$ (III)

where:
$R^2$, $R^3$, $R^4$ are each, independently of one another, alkyl, alkenyl, cycloalkyl, aralkyl, with the abovementioned groups being able to be substituted and/or being able to comprise heteroatoms.

21. The process according to claim 1, wherein the phosphorous ester is selected from the group consisting of triethyl phosphite and tributyl phosphite.

* * * * *